(12) United States Patent
King

(10) Patent No.: US 8,631,983 B2
(45) Date of Patent: Jan. 21, 2014

(54) HOLDER

(75) Inventor: Albert Stephen King, Renton, WA (US)

(73) Assignee: CVG Management Corporation, New Albany, OH (US)

( * ) Notice: Subject to any disclaimer, the term of this patent is extended or adjusted under 35 U.S.C. 154(b) by 1393 days.

(21) Appl. No.: 11/757,073

(22) Filed: Jun. 1, 2007

(65) Prior Publication Data

US 2008/0296332 A1     Dec. 4, 2008

(51) Int. Cl.
     *B60R 7/04*         (2006.01)

(52) U.S. Cl.
     USPC ............ 224/555; 224/483; 224/565; 224/929

(58) Field of Classification Search
     USPC ................. 224/540, 555, 929, 483, 564–565; 108/44, 151, 157.16, FOR. 104, 45, 59
     See application file for complete search history.

(56) References Cited

U.S. PATENT DOCUMENTS

| | | | | |
|---|---|---|---|---|
| 1,915,958 | A | * | 6/1933 | Skirrow ........................ 248/300 |
| 2,640,595 | A | * | 6/1953 | Byford ............................ 211/74 |
| 2,789,861 | A | * | 4/1957 | Hudson ..................... 296/37.12 |
| 3,386,765 | A | * | 6/1968 | Drach, Jr. ................... 296/37.12 |
| 4,087,126 | A | * | 5/1978 | Wynn .......................... 296/37.8 |
| 4,867,498 | A | * | 9/1989 | Delphia et al. .............. 296/37.7 |
| 4,930,737 | A | * | 6/1990 | McNeill ..................... 296/37.12 |
| 4,957,056 | A | | 9/1990 | Martin |
| 4,979,657 | A | * | 12/1990 | Espiritu ........................ 224/549 |
| 5,033,709 | A | * | 7/1991 | Yuen ............................ 248/313 |
| 5,098,141 | A | | 3/1992 | Bull |
| 5,127,355 | A | | 7/1992 | Magers et al. |
| 5,187,744 | A | * | 2/1993 | Richter ......................... 379/449 |
| 5,190,314 | A | | 3/1993 | Takasugi |
| 5,207,471 | A | * | 5/1993 | Mutschler et al. ......... 296/37.12 |
| 5,226,304 | A | | 7/1993 | Scott |
| 5,355,703 | A | | 10/1994 | Elinski et al. |
| 5,573,214 | A | * | 11/1996 | Jones et al. ................. 248/311.2 |
| 5,630,630 | A | | 5/1997 | Price et al. |
| 5,664,714 | A | * | 9/1997 | Navarro et al. ............... 224/275 |

(Continued)

FOREIGN PATENT DOCUMENTS

| | | | |
|---|---|---|---|
| DE | 3322036 A1 | * | 1/1985 |
| GB | 2277912 A | * | 11/1994 |
| JP | 61157453 A | * | 7/1986 |
| JP | 06156149 A | * | 6/1994 |

OTHER PUBLICATIONS

Web advertisements showing products on sale before filing date, 4 pp.

*Primary Examiner* — Justin Larson
*Assistant Examiner* — John Cogill
(74) *Attorney, Agent, or Firm* — Kegler Brown Hill & Ritter; James J. Pingor

(57) ABSTRACT

A holder and vehicle storage system are provided for securely retaining objects, such as in the glove compartments of automobiles, trucks, boats, etc. The holder may be mounted to the inside of a glove compartment door such that it is out of sight when the glove compartment door is closed. The vehicle storage system uses a conventional latch mechanism to mount the holder to the door without the need for additional fasteners. An object may be retained within the holder through the use of two undercut tabs for snap-fit reception of the object. The holder and vehicle storage system may be used to hold electronic instruments having sensitive components that would otherwise be damaged during movement of a vehicle.

20 Claims, 5 Drawing Sheets

(56) References Cited

U.S. PATENT DOCUMENTS

| | | | |
|---|---|---|---|
| 5,697,071 A * | 12/1997 | Fan | 455/575.9 |
| 5,971,242 A * | 10/1999 | Schuerman | 224/544 |
| 6,062,518 A * | 5/2000 | Etue | 248/231.21 |
| 6,229,893 B1 * | 5/2001 | Chen | 379/454 |
| 6,327,993 B1 * | 12/2001 | Richens, Jr. | 114/361 |
| 6,611,430 B1 | 8/2003 | Richard et al. | |
| 6,682,115 B1 * | 1/2004 | Tiesler | 296/37.1 |
| 6,785,567 B2 * | 8/2004 | Kato | 455/575.9 |
| 6,799,875 B2 | 10/2004 | Flokstra et al. | |
| 6,932,309 B1 | 8/2005 | Corey et al. | |
| 6,994,050 B2 | 2/2006 | Johnson et al. | |
| 7,053,866 B1 | 5/2006 | Mimran | |
| 7,063,037 B1 | 6/2006 | Parks | |
| 7,469,951 B2 * | 12/2008 | Welschholz et al. | 296/37.8 |
| 7,708,328 B2 * | 5/2010 | Doom et al. | 296/37.12 |
| 7,900,988 B2 * | 3/2011 | Ryu | 296/37.12 |
| 2002/0190176 A1 * | 12/2002 | Louh | 248/316.4 |
| 2009/0033117 A1 * | 2/2009 | Carpenter | 296/37.1 |

* cited by examiner

HOLDER

FIELD OF THE INVENTION

This invention relates to a holder and, more particularly, to a holder mounted to a glove compartment for holding an electronic device.

BACKGROUND OF THE INVENTION

Portable electronic devices, such as cell phones, personal digital assistants, wireless handheld devices, and digital audio players, are becoming increasingly popular. The value of these devices arises, in large part, due to their portability, i.e., due to their light and compact nature and their ease of transport. Given the relative expensiveness of such devices, it is desirable to store them in some sort of mounted storage holder to avoid misplacing or losing these devices when they are not in use.

Further, in light of the portability of such electronic devices, consumers often take such devices along with them while engaging in recreation or traveling in vehicles, such as automobiles, trucks, boats, etc. These electronic devices give consumers capabilities that they might not otherwise have while traveling, such as, for example, communicating remotely with third parties, accessing the internet and listening to music. Given the expensiveness of such devices, however, it is often desirable to transport them in a secure manner in order to prevent them from becoming damaged or stolen when traveling in a vehicle.

One common method of storing such electronic devices when traveling is to place them in the glove compartment of a vehicle. Storing an electronic device in a glove compartment provides several advantages. Storing a device in this manner conceals it from the sight of a vehicle occupant or casual passerby and therefore serves to make the device less vulnerable to theft. Also, an electronic device may be further protected from theft by securing it in a glove compartment that may be locked.

Glove compartments, however, have not been specifically designed for carrying such electronic devices, and accordingly, suffer from a number of shortcomings. More specifically, glove compartments do not provide a way for electronic devices to be mounted within the glove compartment, thereby resulting in the storing of electronic devices in a haphazard and cluttered manner. Further, electronic devices contain sensitive internal components that are particularly vulnerable to damage resulting from violent impact with the interior of a glove compartment during motion of the vehicle. Thus, because electronic devices are not immovably mounted in the glove compartment, their sensitive internal components often become damaged by such violent impact, thereby rendering the electronic device inoperative. It also is important to store electronic devices in a manner that they cannot be accidentally activated. This is undesirable because the power may become depleted and the device therefore will not operate when desired until charged.

There is also a need for a holder that allows electronic devices to be mounted in a glove compartment while simultaneously providing musical entertainment to occupants of the vehicle. For example, certain electronic devices, such as a digital audio player with an FM transmitter plug-in accessory, may be operated while being carried in the glove compartment. Such electronic devices can be used to wirelessly connect the digital audio player to the vehicle's FM stereo. This wireless connection allows music from the digital audio player to be played over the vehicle FM receiver while the digital audio player is mounted and locked in the glove compartment.

Further, there is a need for the storage of electronic devices in the marine environment. Generally, recreational watercraft suffer from a lack of abundant storage space, such as for securely storing a portable electronic device. In this marine environment, it is important to be able to store electronic devices in glove compartments to protect them from water damage resulting from wind and spray. Other storage areas, such as on or near the floor of a boat, often accumulate moisture that would otherwise damage an electronic device and likely render it inoperative. Thus, it is particularly important to provide a glove compartment that can hold an electronic device in a manner that prevents unwanted clutter, to make the electronic device less vulnerable to theft, and to prevent damage to the electronic device based on violent impact caused by the high load marine environment, i.e., violent impact, for example, caused by sudden up-and-down or side-to-side changes in boat direction or by jarring contact with the water.

Accordingly, a need exists for a simple electronic device holder that can be mounted, such as to the inside of the glove compartment door of an automobile, truck, boat, or other vehicle, for securely holding a portable electronic device. Such a holder should allow the electronic device to be easily removed from the holder. Further, such a holder should be easy to mount and install and not require any special tools or fasteners to mount the holder to the door.

DESCRIPTION OF THE PREFERRED EMBODIMENTS

Figure 1:
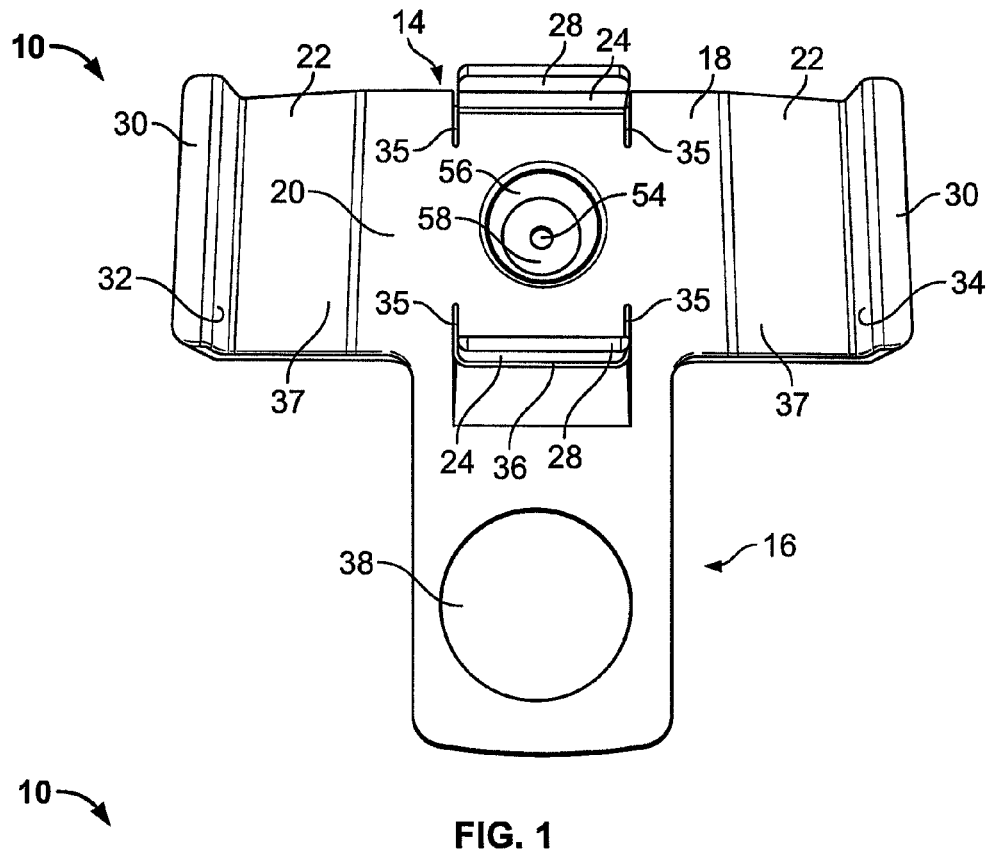
FIG. 1 is a top perspective view of a first holder embodying features of the present invention.
Figure 2:
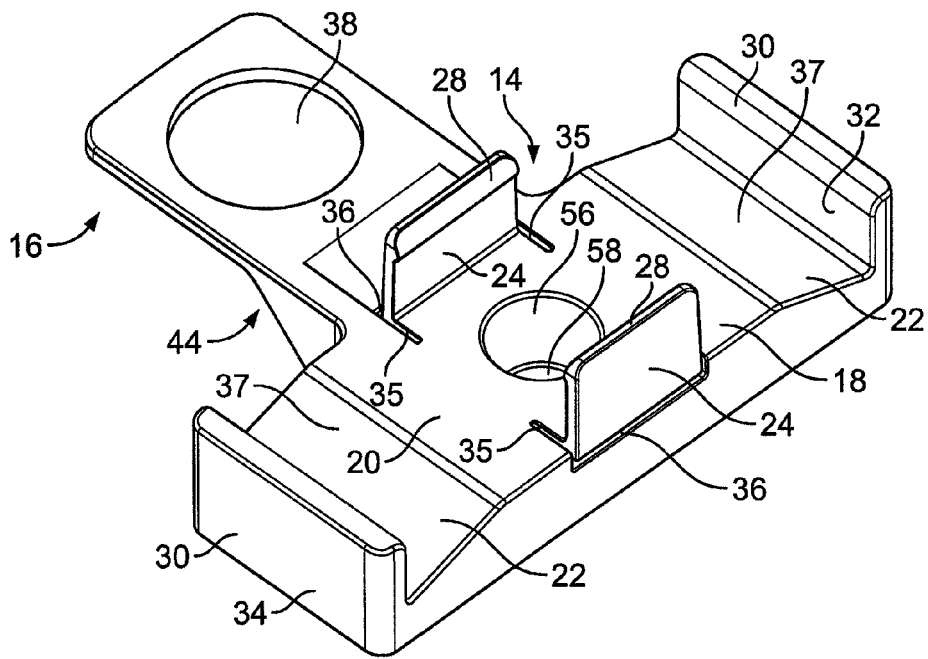
FIG. 2 is a perspective view of the holder of FIG. 1.

With reference to FIGS. 1-2, there is illustrated a holder 10 for the secure retention of an object therein. The holder 10 may be designed for mounting to any desired supporting structure so that the holder 10 and the object are retained immovably with respect to the supporting structure. The object to be held may be virtually any object for which it is desirable to be secured as described herein, but it is contemplated that holder 10 may be particularly desirable for holding relatively compact and costly electronic instruments containing delicate electronic components therein. Such electronic instruments may include, for example and without limitation, cell phones, personal digital assistants, wireless handheld devices, and digital audio players. The embodiment of the holder 10 shown in FIGS. 1-2 is designed for the secure mounting of an Apple iPod® therein.

Figure 3:
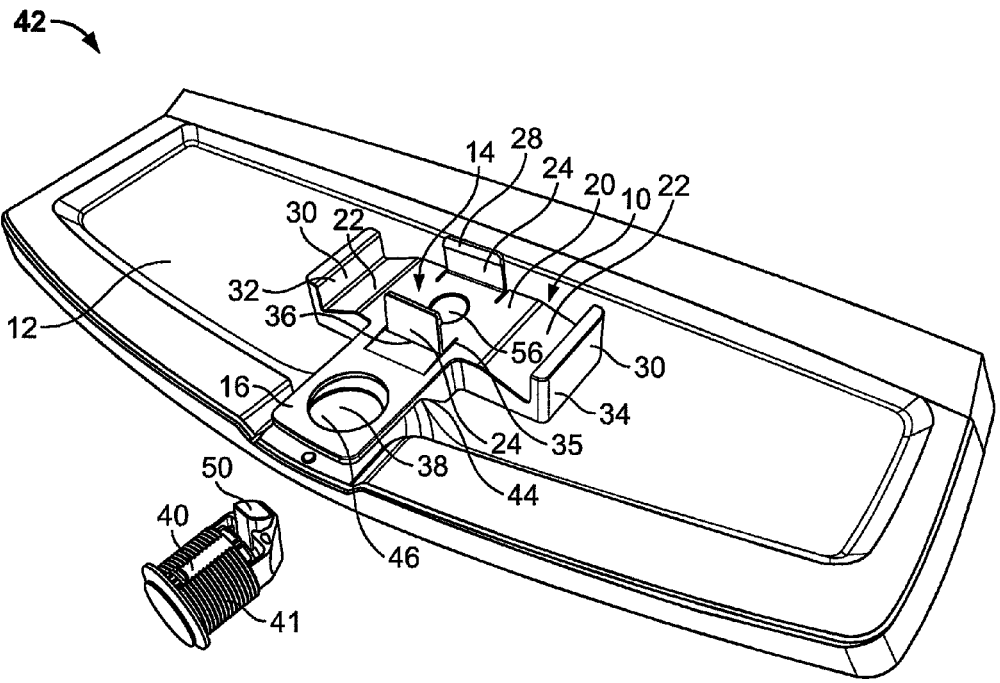
FIG. 3 is a perspective view of a disassembled vehicle storage compartment door with the holder of FIG. 1.
Figure 4:
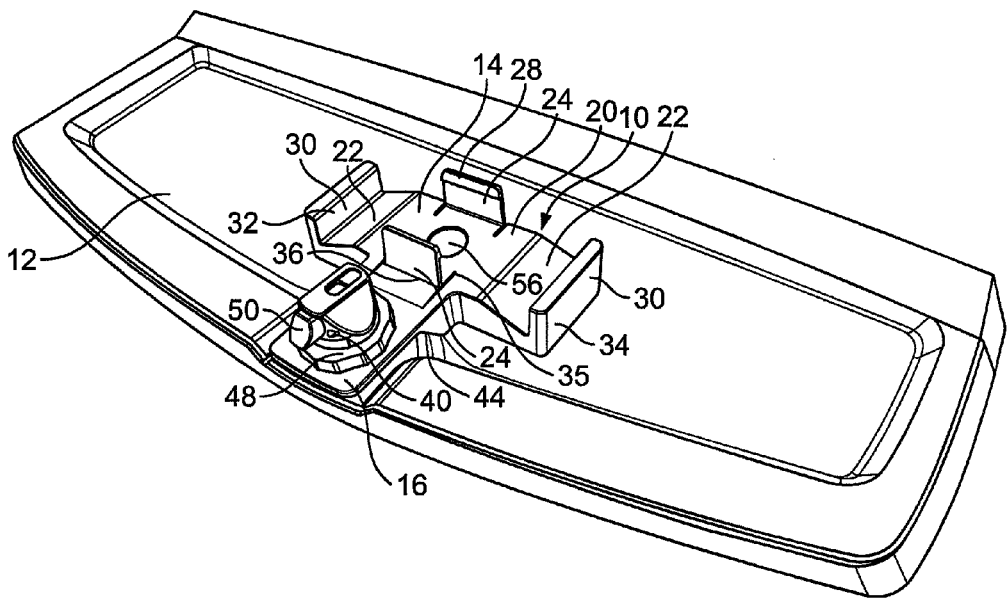
FIG. 4 is a perspective view of an assembled vehicle storage compartment door with the holder of FIG. 1.
Figure 5:
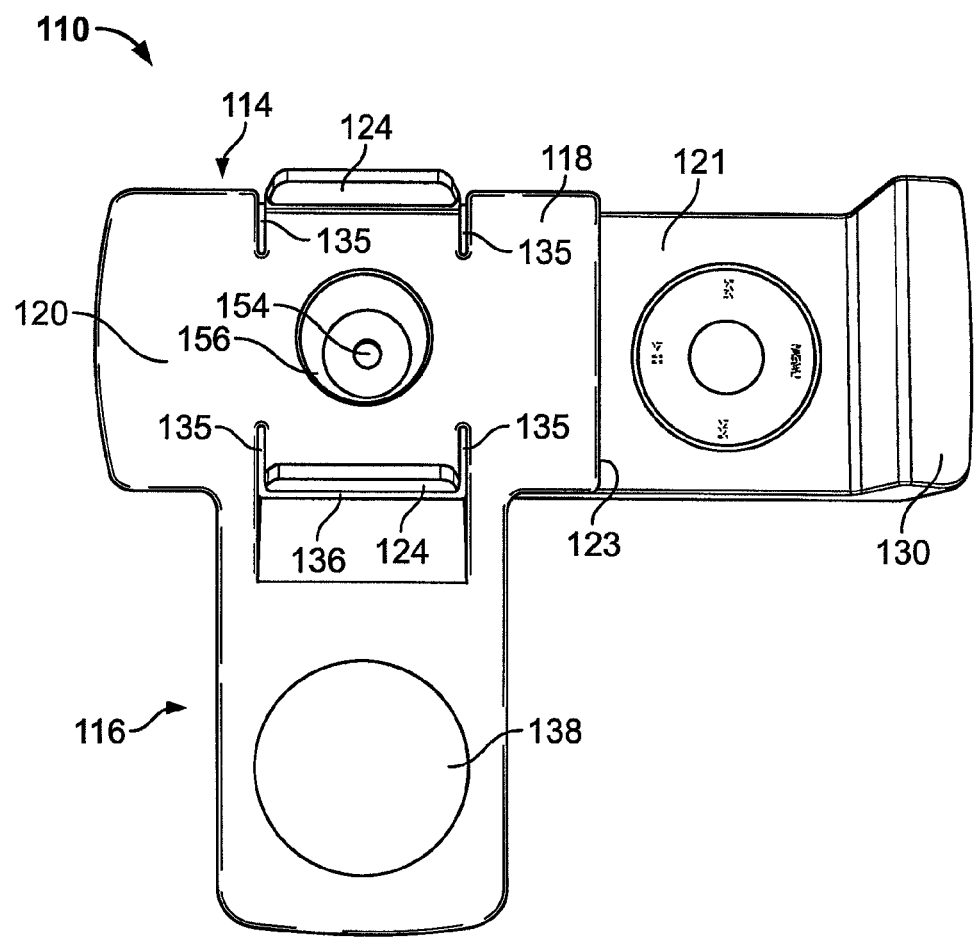
FIG. 5 is a top perspective view of a second holder embodying features of the present invention.
Figure 6:
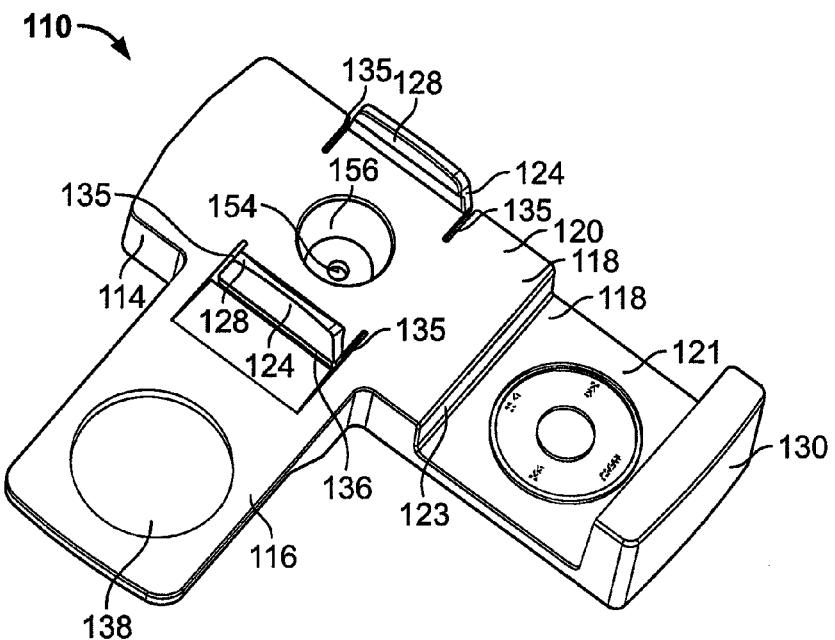
FIG. 6 is a perspective view of the holder of FIG. 5.

In one form, as shown in FIGS. 3 and 4, the holder 10 may be used as part of a vehicle storage system wherein the holder 10 is mounted to a glove compartment of a vehicle, such as an automobile, truck, marine craft, etc. The holder 10 may be used in conjunction with many known conventional types of glove compartments. In a conventional glove compartment, the door is moveable between an open position, exposing the interior and contents of the glove compartment to an occupant of the vehicle, and a closed position, in which the interior and contents are concealed. A standard glove compartment contains a latch that is operable to open and close the glove compartment, i.e., to allow the glove compartment door to be moved between the open and closed positions. Optionally, a lock may be incorporated into the latch to allow the opening of the door by an authorized user only and to thereby limit theft of the contents of the glove compartment.

As can be seen from FIGS. 3-4, the holder 10 may be used to mount an object, such as an iPod®, to a door 12 of a glove compartment such that the holder 10 and the mounted object are not visible when the door 12 is closed. The holder 10 generally includes two components: a retention member 14, for retaining an object in the holder 10, and an attachment member 16, for mounting the holder 10 to the glove compartment door 12. The holder 10 may be conveniently and economically formed as one integral piece of injection molded plastic. Although the preferred embodiments are shown as formed of one integral piece, two or more separate pieces may also be used. For example, a separate retention member and attachment member may be separately formed and fastened together according to any conventional method of fastening. Further, although the holder is preferably formed from a plastic material, it may also be formed of other suitable materials.

The retention member 14 includes several features for retaining an object in an immobile manner with respect to the holder 10. The retention member 14 includes a top surface 18, which includes a support surface 20, for supporting the object to be held, and two non-support surfaces 22, for allowing easy removal of a mounted object, as described further below. The support surface 20 is preferably substantially planar and rectangular in shape to support a corresponding surface of an object to be held. When the object is mounted, the support surface 20 is preferably in abutting engagement with the corresponding surface of the object.

The retention member 14 also includes a set of side tabs 24 projecting generally perpendicularly away from the support surface 20. As shown in FIGS. 1 and 2, the set of side tabs 24 is preferably in the form of two undercut tabs projecting from the support surface 20. More specifically, the retention member 14 includes grooves 35 and slots 36 therein that allow the side tabs 24 to flex outwardly to receive objects for being mounted in the holder 10. As can be seen in FIGS. 1 and 2, a pair of grooves 35 extends inwardly from the opposite sides of each side tab 24. Further, a slot 36 extends underneath the support surface 20 and between the grooves 35 of each side tab 24. These grooves 35 and slots 36 allow the undercut side tabs 24 to flex to receive an object to be mounted between the side tabs 24.

Each undercut side tab 24 has a distal edge 28 disposed a short distance inwardly towards the distal edge 28 of the opposing side tab 24. When an object is to be mounted in the retention member 14, the grooves 35 and slots 36 allow the edges 28 to move outwardly to accommodate insertion of the object. The undercut side tabs 24 with their inwardly projecting tip edges 28 provide snap-fit reception of the object by engaging with the top side of the object to be held and by resisting movement away from the support surface 20. The undercut side tabs 24 resist side-to-side movement of the object, longitudinal movement of the object, and movement of the object away from the support surface 20.

The width of the holder 10 is designed such that the side tabs 24 are spaced at a predetermined distance apart from one another. The side tabs 24 are designed with a desired spacing to securely retain a desired object of a certain width between the tabs 24. The length of the side tabs 24 are designed to maintain a desired object against the support surface 20. The undercut tabs 24 retain the object within the holder 10 to counteract movement, such as the movement of a vehicle, tending to dislodge the object from the holder 10.

The retention member 14 further preferably includes a set of end tabs 30 that are oriented in a perpendicular manner with respect to the plane defined by the support surface 20. The end tabs 30 project upwardly in the same general direction as the side tabs 24 but extend preferably perpendicular to the side tabs 24. The end tabs 30 are preferably in the form of two tabs extending from opposing front and back ends 32 and 34 of the retention member 14 and defining a predetermined spacing therebetween. This predetermined spacing corresponds generally to the length of the object to be held and prevents slippage of the object. More specifically, the end tabs 30 resist longitudinal movement of the mounted object.

Further, as shown in FIGS. 1-4, the top surface 18 of the retention member 14 includes an inclined non-support surface 22 lying between the support surface 20 and each of the end tabs 30. More specifically, the inclined non-support surfaces 22 are located to either side of the centrally located support surface 20. The inclined non-support surfaces 22 are substantially planar and each defines an acute angle, preferably the same acute angle, with respect to the plane defined by the support surface 20. When an object is mounted in abutting engagement with the support surface 20, a gap 37 is defined by each non-support surface 22 and the object being held. This gap 37 facilitates access to the underside of the held object for gripping and removing the object.

In the preferred embodiments, the retention member 14 is integrally connected to the attachment member 16, i.e., the holder 10 is preferably formed of one molded piece. The attachment member 16 is configured for mounting the holder 10, such as to a glove compartment door 12. As shown in FIGS. 1-3, the attachment member 16 defines an opening 38 of a predetermined size, such as for insertion of a latch mechanism 40 therethrough (as described further below). When the holder 10 is used with a glove compartment door 12, the opening 38 is preferably circular in shape, but it also may be any of various shapes to accommodate different latch mechanisms of varying shapes.

A vehicle storage system 42, including the holder 10, the door 12 for a glove compartment, and the latch mechanism 40, is shown in FIGS. 3 and 4. As can be seen, the holder 10 includes a bottom surface 44 that preferably has a contour that complements the corresponding contour of the inside of the glove compartment door 12. In other words, the holder 10 is shaped to engage the door 12 along much, if not all, of the holder's bottom surface 44. This provides a solid engagement between the two, which reduces the degree of impact between the holder 10 and the door 12 that might otherwise arise during movement of the vehicle and that might otherwise tend to dislodge an object from the holder 10.

With reference to FIGS. 3 and 4, the glove compartment door 12 and the latch mechanism 40 shown in FIGS. 3 and 4 are a conventional door and latch mechanism and other conventional types may be used. The latch mechanism 40 is a cylinder lock type commonly used in marine applications. The cylinder lock 40 has an outer diameter of approximately one inch. It is sized such that it may be inserted through the opening 38 in the attachment member 16 and then through a similarly sized opening 46 in the glove compartment door 12.

As illustrated in FIG. 4, the holder 10 is shown mounted to the glove compartment door 12. The cylinder lock 40 includes a cylinder lock nut 48 and release 50 and is mounted to the glove compartment door 12 in a conventional manner. For example, a threaded shaft portion 41 of the cylinder lock 40 extends through the aligned openings 38 and 46. A cylinder lock nut 48 is threaded onto the end of the cylinder lock shaft portion 41 to lock the cylinder lock onto the door 12. The holder 10 is sandwiched between the lock nut 48 and the door 12. This positioning of the holder 10 allows the holder 10 to be mounted in close frictional engagement between the cylindrical lock nut 48 and the door 12 so as to allow the holder 10 to be firmly and securely held against the door 12, thereby preventing movement of the holder 10.

The holder 10 can be mounted to the glove compartment door 12 in the above manner. This method of mounting makes use of existing features, i.e., it makes use of the existing latch mechanism 40 and the glove compartment door 12 to mount the holder 10. One advantage of this manner of mounting is the elimination of the use of new and additional fasteners and mounting features, such as screws, tape, etc., that would make mounting the holder 10 relatively inconvenient and burdensome and that might not secure the holder 10 as effectively within the glove compartment.

Although it is preferred that the holder 10 be mounted in the above manner, the retention member 14 may optionally include an aperture 54 therethrough to allow for an additional fastener for mounting the retention member 14 to the glove compartment door 12. As shown in FIGS. 1-2, the retention member 14 may include a cylindrical depression 56 extending perpendicularly into, and partially through, the retention member 14. The aperture 54, in turn, extends centrally through the bottom 58 of the cylindrical depression 56, thereby providing access to a fastener, such as a screw, for mounting the retention member 14 to the glove compartment door 12. The cylindrical depression 56 provides a region for affixing the fastener to the door 12 such that the fastener does not interfere with an object mounted to and in abutting engagement with the support surface 20.

Figure 7:
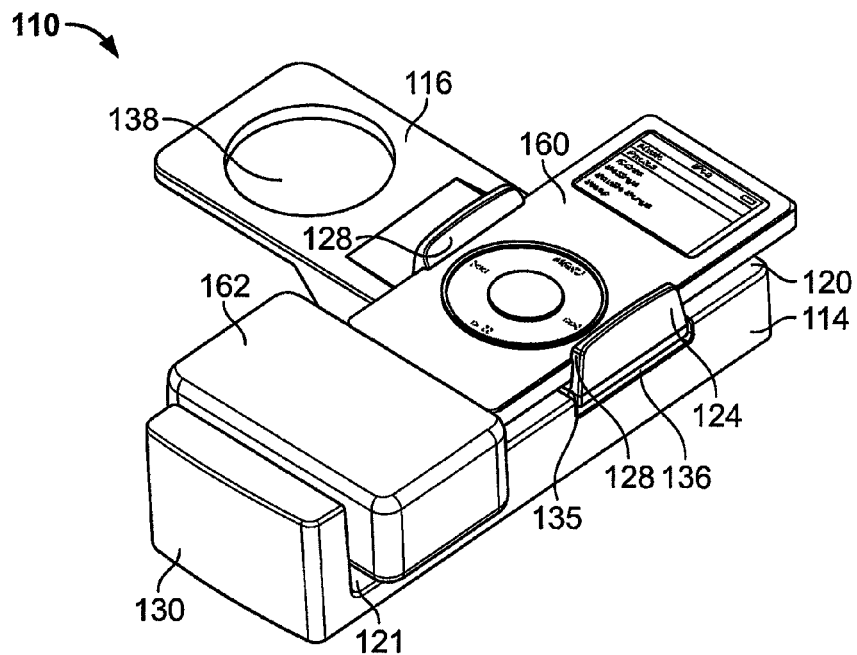
FIG. 7 is a perspective view of the holder of FIG. 5 holding an Apple iPod Nano® and FM transmitter plug-in accessory.

A second preferred embodiment of the holder 110, and a vehicle storage system 142 using the holder 110, are shown in FIGS. 5-9. The holder 110 and the vehicle storage system 142 are similar to the first preferred embodiments described above. The holder 110 includes a retention member 114, for securely retaining an object mounted therein, and an attachment member 116, such as for attaching the holder 110 to a glove compartment door 112 of a vehicle. The retention member 114 has been modified slightly so as to make it suitable for holding an iPod Nano® 160 with an FM transmitter plug-in accessory 162, as shown in FIG. 7. In this circumstance, the term "object" as used herein refers to the combination of two or more components, i.e., to the combination iPod Nano® 160 and plug-in 162.

The retention member 114 includes a top surface 118 having two support surfaces 120 and 121 to mount the iPod Nano® 160 and plug-in accessory 162, respectively. The two support surfaces 120 and 121 reside in parallel planes that are offset from one another. The first support surface 120 is intended to be in abutting engagement and provide support for the iPod Nano® 160, while the second support surface 121 is intended to mount the thicker plug-in accessory 162.

More specifically, the first support surface 120 is preferably planar and rectangular in shape to support a corresponding surface of the iPod Nano® 160. The first surface 120 also includes side tabs 124, preferably in the form of a pair of undercut tabs, projecting perpendicularly outward from the first surface 120, and having engaging distal edges 128 for snap-fit reception of the iPod Nano® 160 within the tabs 124. The first surface 120 also preferably includes grooves 135 and slots 136 that allow the undercut side tabs 124 to flex outwardly for insertion and retention of objects therein. The first surface 120 also optionally includes a cylindrical depression 156 and aperture 154 for providing an additional manner of fastening the holder 110.

The second support surface 121 also is preferably planar and rectangular in shape for mounting and supporting the plug-in accessory 162. The first and second surfaces 120 and 121 are interconnected by an intermediate step 123. The second surface 121 has a front end defined by the step 123 and a back end defined by an upwardly projecting tab, or stop 130. The step 123 and the stop 130 are oriented and positioned so as to resist longitudinal movement of the plug-in accessory 162 that might otherwise tend to dislodge the iPod Nano® 160 and the plug-in accessory 162 from the holder 110, such as might arise during movement of a vehicle. As shown in FIGS. 5, 6, 8, and 9, the second support surface 121 also may include indicia instructing the consumer that the plug-in accessory 162 is to engage the second support surface 121.

Figure 8:
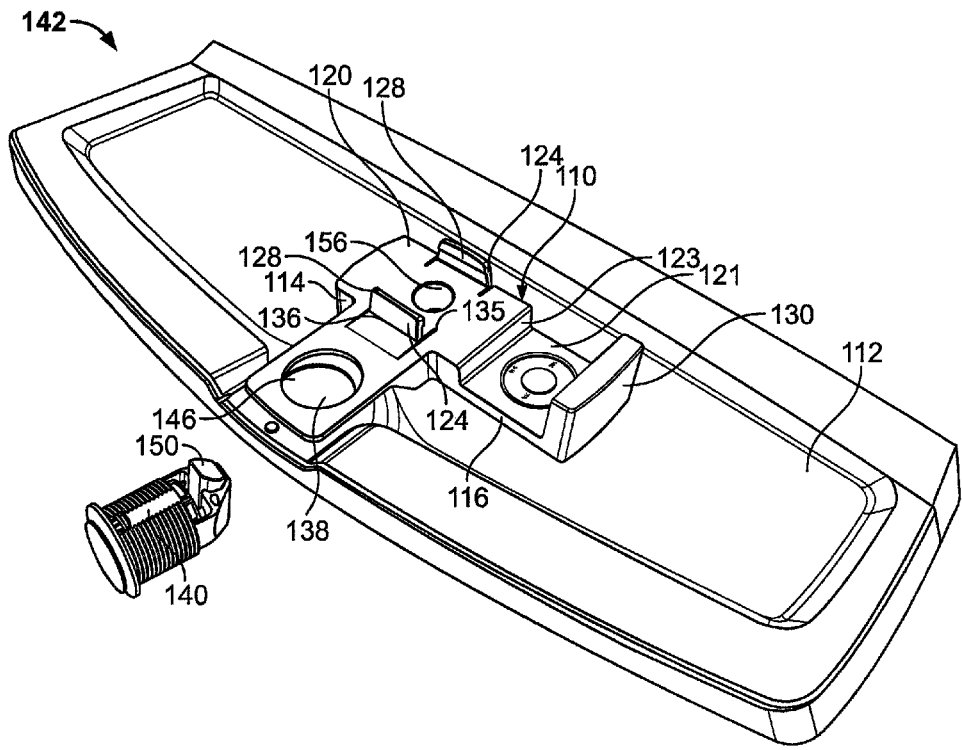
FIG. 8 is a perspective view of a disassembled vehicle storage compartment door with the holder of FIG. 5.
Figure 9:
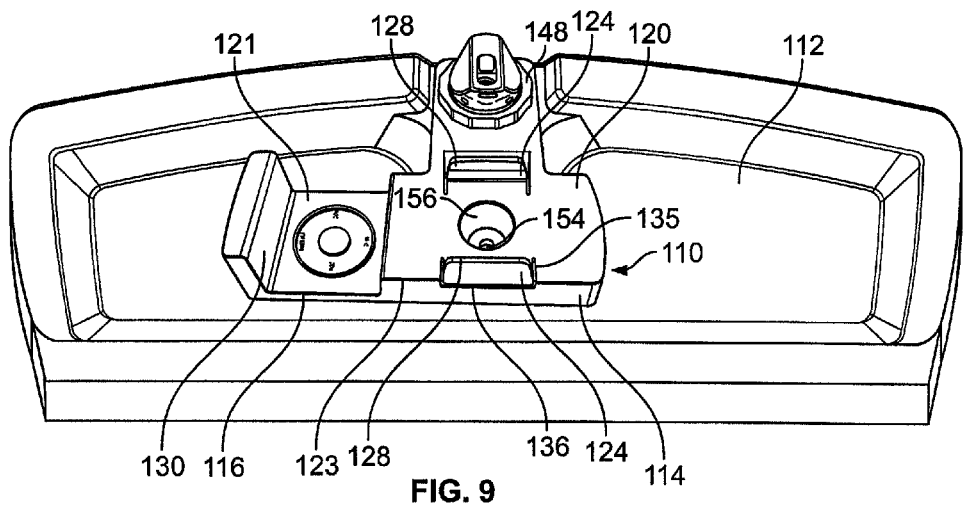
FIG. 9 is a perspective view of an assembled vehicle storage compartment door with the holder of FIG. 5.

A vehicle storage system 142 is shown in FIGS. 8 and 9. The system 142 includes the holder 110, a latch mechanism 140, and a door 112 for a glove compartment. The latch mechanism 140 is preferably a cylinder lock type having a cylinder lock nut 148 and a latch release 150. The cylinder lock 140 is inserted through an opening 138 in the attachment member 116 and through a similarly sized opening 146 of corresponding size in the door 112. During conventional mounting of the cylinder lock 140 to the door 112, the holder 110 is sandwiched between the door 112 and the cylinder lock nut 148, thereby allowing the holder 110 to be tightly and securely held against the door 112.

Although the preferred embodiments described above were directed to holders for retaining an iPod® and an iPod Nano® with FM transmitter plug-in accessory, it should be evident that the invention is not limited to holding these specific types of objects. The holder and vehicle storage system described herein may be used to hold any desired object immobile within a glove compartment. The holder and vehicle storage system may be designed having different sizes and dimensions to accommodate different types of objects.

It is contemplated that the holder and vehicle storage system may be particularly useful to hold electronic instruments with fragile components that would otherwise suffer damage arising from violent impact with the interior of the glove compartment during movement of the vehicle. There are other advantages to using the holder and vehicle storage system to store electronic instruments. For example, storing costly electronic instruments in a secure manner out of the casual sight of others reduces the risk of theft and vandalism. Moreover, the holder and vehicle storage system may be used on watercraft having little available storage space to keep a stored electronic instrument free from moisture that might otherwise damage its sensitive electronic components. Further with respect to electronic instruments like the iPod Nano® with FM transmitter plug-in accessory described above, such electronic instruments may, in fact, be operated to provide musical entertainment for vehicle occupants while remaining in a locked and unseen location and may remain stored in the locked glove compartment when not in use.

Further, although the preferred embodiments show the holder used in conjunction with the vehicle storage system described herein, it should be evident that the holder may be mounted in many other ways. More specifically, it should be evident that the holder may be mounted to other support structures and need not be mounted to a glove compartment door at all. For example, the holder may be designed for mounting to other support structures having one or more openings of standardized size and shape, such as without limitation the standardized patterns of various light switches. The attachment member of the holder may be easily modified to make openings therethrough commensurate with such standardized patterns and to thereby enable mounting of the holder to such support structures.

The foregoing relates to preferred exemplary embodiments of the invention. It is understood that other embodiments and variants are possible which lie within the spirit and scope of the invention as set forth in the following claims.

What is claimed is:

1. A vehicle storage system for holding an object, the vehicle storage system comprising:
   a door with a latch extending therethrough for opening and closing the door; and
   a holder comprising:
      a retention member for holding the object, the retention member comprises:
      a top surface including:
         a support surface that supports the object; and
         a non-support surface disposed adjacent on each longitudinal side of the support surface, each non-support surface being angled below a plane of the support surface thereby forming an acute angle between the support surface and each non-support surface;
      a first set of tabs comprising a side tab disposed on non-longitudinal opposite sides of the support surface; and
      a second set of tabs comprising an end tab disposed at each longitudinal end of the top surface such that the first set of tabs are substantially perpendicular to the second set of tabs;
   an attachment member extending from the retention member and defining an opening therethrough;
   wherein the opening of the attachment member of the holder engageably receives at least a portion of the latch of the door therethrough; and
   wherein the latch has a first end operative to open the door and has a second end that mounts the attachment member between the second end and the door.

2. The vehicle storage system of claim 1 wherein the latch comprises a cylindrical portion extending through the door, and wherein the opening is substantially circular in shape to receive the latch therethrough and sized for the attachment member to contact the fastener to engageably receive the holder.

3. The vehicle storage system of claim 2 wherein the latch comprises a cylinder lock.

4. The vehicle storage system of claim 1 wherein the second end of the latch includes a latch release for opening the door when the first end of the latch is actuated.

5. The vehicle storage system of claim 1 wherein the first set of tabs comprises two undercut tabs.

6. The vehicle storage system of claim 1, wherein a gap is defined between each non-support surface and the object to facilitate removal of the object from the retention member.

7. The vehicle storage system of claim 1 wherein the retention member further defines an aperture therethrough for receiving a fastener for mounting the retention member to the door.

8. The vehicle storage system of claim 1 wherein the retention member and attachment member together define a contoured surface for engagement with the door when the retention member and attachment member are mounted to the door.

9. The vehicle storage system of claim 1 wherein the retention member and attachment member are integral portions of a one-piece body.

10. The vehicle storage system of claim 1 wherein the retention member is adapted to receive one of a cell phone, a personal digital assistant, a wireless handheld device, or a digital audio player.

11. The vehicle storage system of claim 1, wherein the first set of tabs of the holder further comprises at least one moveable tab, and wherein the retention member further comprises one or more grooves and one or more slots such that at least one moveable tab of the first set of tabs is able to move outward by means of the one or more grooves and the one or more slots.

12. The vehicle storage system of claim 1, wherein the door defines at least a portion of a compartment when closed, and the retention member and attachment member are internal to the compartment when the door is closed.

13. The vehicle storage system of claim 1, wherein the support surface and the non-support surfaces are substantially planar.

14. The system of claim 1, wherein at least one of the first set of tabs and the second set of tabs include engaging distal edges that snap around the object.

15. A vehicle storage system for holding an object, the vehicle storage system comprising:
   a door with a latch extending therethrough for opening and closing the door; and
   a holder comprising:
      a retention member for holding the object, the retention member comprises:
         a first surface including a set of tabs for retaining the object; and
         a second surface that retains an accessory operatively coupled with the object, the second surface having a projection at one end that extends substantially perpendicular to the second surface,
      wherein the first surface and the second surface are longitudinally adjacent and offset from each other in substantially parallel planes such that a step is defined between one end of the first surface and an end opposite that of the projection of the second surface, whereby the projection and the step resist movement of the accessory in a longitudinal direction;
   an attachment member extending from the retention member and defining an opening therethrough;
   wherein the opening of the attachment member of the holder engageably receives at least a portion of the latch of the door therethrough; and
   wherein the latch has a first end operative to open the door and has a second end that mounts the attachment member between the second end and the door.

16. The vehicle storage system of claim 15, wherein the retention member and attachment member are integral portions of a one-piece body.

17. The vehicle storage system of claim 15, wherein the retention member is adapted to receive one of a cell phone, a personal digital assistant, a wireless handheld device, or a digital audio player.

18. The vehicle storage system of claim 15, wherein the set of tabs includes at least one moveable tab, and wherein the retention member further comprises one or more grooves and one or more slots such that the at least one moveable tab of the set of tabs is moveable outward by means of the one or more grooves and the one or more slots.

19. The vehicle storage system of claim 15, wherein the door defines at least a portion of a compartment when closed, and the retention member and attachment member are internal to the compartment when the door is closed.

20. The vehicle storage system of claim 15, wherein the retention member further defines an aperture therethrough for receiving a fastener for mounting the retention member to the door.

\* \* \* \* \*